United States Patent [19]

Runaldue

[11] Patent Number: 5,784,374
[45] Date of Patent: Jul. 21, 1998

[54] CONTENTION RESOLUTION SYSTEM IN ATM SWITCH

[75] Inventor: Thomas Jefferson Runaldue, San Jose, Calif.

[73] Assignee: Advanced Micro Devices, Inc., Sunnyvale, Calif.

[21] Appl. No.: 597,309

[22] Filed: Feb. 6, 1996

[51] Int. Cl.$^6$ .................................................. H04J 3/02
[52] U.S. Cl. .......................... 370/414; 370/352; 370/394; 370/411
[58] Field of Search .............................. 370/352, 360, 370/394, 399, 411, 412, 414, 447, 462, 392, 389

[56] References Cited

U.S. PATENT DOCUMENTS

| | | | |
|---|---|---|---|
| 5,157,654 | 10/1992 | Cisneros | 370/414 |
| 5,357,506 | 10/1994 | Sugaware | 370/422 |
| 5,404,537 | 4/1995 | Olnowich et al. | 370/447 |
| 5,444,705 | 8/1995 | Olnowich et al. | 370/462 |
| 5,511,070 | 4/1996 | Lyles | 370/411 |

FOREIGN PATENT DOCUMENTS 0 405 042  1/1991  European Pat. Off. ......... H04L 12/56

OTHER PUBLICATIONS

"A High Speed Integrated Services Switch Based on 4 X 4 Switching Elements," IEEE Infocom '90, Ninth Annual Joint Conference of the IEEE Computer and Communications Societies. The Multiple Facets of Integration, Jun. 3–7, 1990, San Francisco, CA, USA, IEEE Computer Society Press, Los Alamitos, CA.

Primary Examiner—Douglas W. Olms
Assistant Examiner—Shick Hom

[57] ABSTRACT

An ATM switch is provided with two stages of crossbar switches with internal blocking paths between the stages. To define priorities of input ports, switches of stage 1 calculate the effective serial numbers of the input ports based on their physical serial numbers and global offset values. To provide dynamic modification of the input port priorities, the global offset values can be changed in each cell cycle of the ATM switch. A sequence of encoded requests for access to required output ports are sent from each switch of stage 1 to each switch of stage 2. Contention arbitration logic in each switch of stage 2 determines which requests may be granted so as to avoid blocking paths between stages 1 and 2, and to prevent out-of-order cell delivery. Signals that acknowledge acceptance of cells and provide information required to establish the serial numbers of the accepted input ports are sent back from each switch of stage 2 to each switch of stage 1. Based on these signals, the cells that will be accepted are routed through the switches of stages 1 and 2 to required output ports. The rejected cells may be queued for transmitting in the next cell cycle.

17 Claims, 7 Drawing Sheets

(BACKGROUND)

(BACKGROUND)

(BACKGROUND)

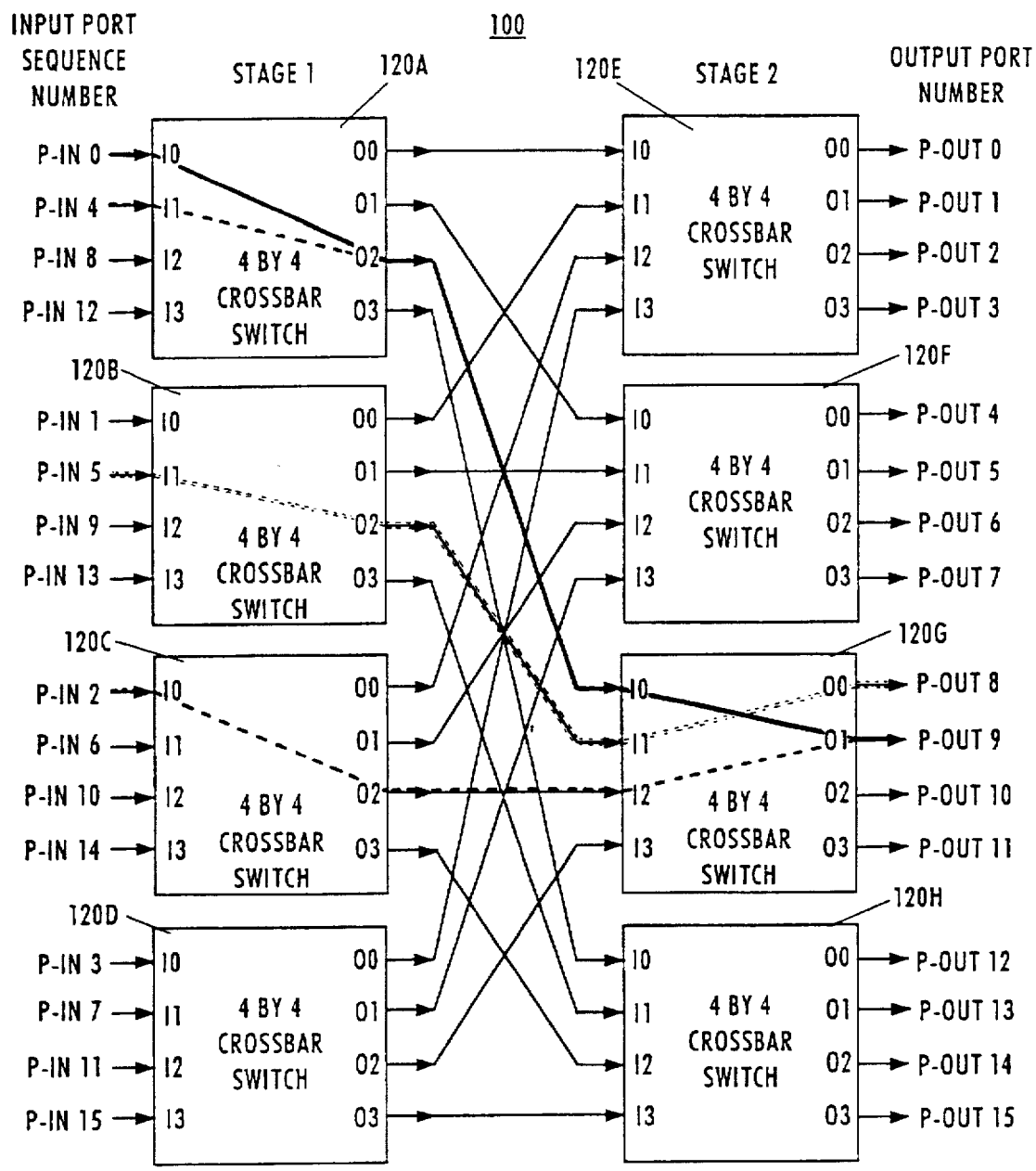

| ENCODED BITS [2:0] | RESPONSE |
| --- | --- |
| 0XX | NO REQUEST |
| 100 | REQUEST TO PORT 00 |
| 101 | REQUEST TO PORT 01 |
| 110 | REQUEST TO PORT 02 |
| 111 | REQUEST TO PORT 03 |

Fig. 8

| INPUT NUMBER | EFFECTIVE SER. NO. | CELL ROUTE NUMBER |
| --- | --- | --- |
| 10 | 0 | 13 |
| 11 | 4 | 3 |
| 12 | 8 | 0 |
| 13 | 12 | 9 |

Fig. 9

| STAGE 2 DEVICE NUMBER | ENCODED SEQUENCE SENT TO STAGE 2 (FIRST VALUE IS SENT FIRST) |
| --- | --- |
| 120E | 000, 111, 100, 000 |
| 120F | 000, 000, 000, 000 |
| 120G | 101, 000, 000, 101 |
| 120H | 101, 000, 000, 000 |

Fig. 10

CONTENTION RESOLUTION SYSTEM IN ATM SWITCH

TECHNICAL FIELD

The present invention relates to data communication networks, and more particularly, to a contention resolution system provided in an asynchronous transfer mode (ATM) switch to prevent cells from arriving at the output of the switch out of order.

BACKGROUND ART

The introduction of the ATM technique is currently being propelled by the need for fast data communications in public and private networks. ATM is a switching technology that is a pivot in the transition from networks based on sharing a common media (e.g. Ethernet, FDDI, Tocken Ring) to switch-based networks that require a centralized switch function. ATM is designed to provide the transfer mode for broadband integrated services digital network (B-ISDN) services. It supports the full gamut of multimedia at circuit speeds higher than T1 and T3 to handle voice, framed data, video and imaging. This switching technique provides multiple switched virtual circuit connections to other users through a single access to the network. Hence, ATM combines the benefits of both circuit switching and packet switching.

The ATM switch is defined by the ATM Forum and the International Telecommunication Union (ITU) Recommendations for B-ISDN that specify ATM functions, service aspects, protocol layer functions, user-to-network interface (UNI) and network-to-network interface (NNI). ATM protocol functions correspond to the first two layers of the Open System Interconnection (OSI) reference model. The ATM switch transfers user information in fixed-length packets called cells. As defined by ITU Recommendation 1.361, an ATM cell contains 48 bytes of user information and 5 bytes of control information. Referring to FIG. 1A, in an ATM UNI cell, the control part or header is composed of the 4-bit Generic Flow Control field (GFC), the 12-bit Virtual Path Identifier (VPI), the 16-bit Virtual Channel Identifier (VCI), the 3-bit Payload Type (PT) field, the Cell Loss Priority (CLP) bit, and the 8-bit Header Error Control (HEC) field. In an ATM NNI cell (FIG. 1B), the GFC field is replaced with four additional VPI bits.

The header information tells the switch which virtual channel and virtual path the cells should be routed to. Each of the channel identifications are local to the multiplexer and can be changed at each switch. The combination of both the VPI and VCI establishes a node-to-node communication channel. Switch routing is then accomplished based on the VCI and VPI. The ATM switch requires a connection to be established between the incoming and outgoing virtual channels before information can be routed through the switch. Based upon the virtual channels identified within the cell header, the ATM switch will then switch and route each individual cell from the incoming multiplexed cell stream to the outgoing multiplexed cell stream. The cell sequence is maintained, and each cell is switched at the cell rate, rather than at the channel rate, to accommodate for variable bit rate transmissions.

The GFC field is used when a single user access point provides services for multiple terminal interfaces, such as those found in a local area network (LAN) environment, to ensure that each terminal will get equal access to the shared network bandwidth. The PT field discriminates between a cell carrying user information and service information in the information field. The CLP field defines a level of semantic priority to allow users or network providers to choose which cells to discard during periods of network congestion. The HEC field provides error checking for the first four header bytes.

When the cells are sent to the ATM switch, they are placed into a queue until they can be multiplexed a synchronously with other cells for transmission. A time slot is allocated only to channels that have data for transmission. The switch adapts the incoming bit rate to the transmit channel rate, inserting dummy cells when needed to achieve the aggregate bit stream rate (e.g. 155.52 Mbps). The remote switch delineates the good cells from the dummy cells based on header information.

An important attribute of ATM switching is that the cell sequence order should be preserved within the switch. A non-blocking switch fabric topology, for example, a crossbar switch, provides unobstructed internal paths from every input port to every output port. This allows cell sequence order to be maintained. However, a non-blocking switch cannot be realized for large port count switching because it requires $2_N$ direct connections which grow exponentially for large part switches for N input ports.

By contrast, a blocking switch fabric technology, e.g. a Banyan network, contains only $\log_2 N$ stages of 2×2 switching elements for N input ports. However, the internal blocking paths of the blocking switch may disrupt a cell stream. As a result, cells may be delivered out of order. This is unacceptable for ATM switching. Referring to FIG. 2, a conventional 16 port Banyan network 10 may contain 4 stages of 2×2 crossbar switches 12. Each stage includes 16 crossbar switches 12. As illustrated, the paths originated at input ports 4 and 12 receive cells addressed to output ports 10 and 13. However, these two paths collide after the first stage of the switches 12. Since only one path can be serviced after the first stage, another path is blocked. When cells are supplied to an input port sequentially, the internal blocking condition will disrupt an input cell sequence, and may result in the out-of-order delivery of input cells to output ports. To prevent such out-of-order delivery, ATM switch resequences the cells arrived at the output ports using control information attached to the cells. However, the resequencing procedure requires an additional buffer memory to hold cells before resequencing. Further, additional logics and registers are required to keep track of the arrived cells. Also, timers are required to ensure that output ports do not wait for the cells discarded due to the blocking conditions, more than a preset period of time. In some instances, an entire additional device is required to resequence ATM cells at an output port. Thus the resequencing procedure substantially increases the cost of ATM switches.

Therefore, it would be desirable to provide a system for resolving contention of cells supplied via internal blocking paths of an ATM switch, to avoid the costly resequencing procedure.

DISCLOSURE OF THE INVENTION

Accordingly, one advantage of the invention is in providing an ATM switch having a system for resolving cell contention caused by internal blocking paths.

Another advantage of the invention is in providing an ATM switch, wherein out-of-order cell delivery is prevented without the resequence of the cells at output ports.

Further advantage of the invention is in preventing out-of-order cell delivery using a system that is low in cost and easily implemented.

The above and other advantages of the invention are achieved, at least in part, by providing a cell switching network for delivering cells from input ports to output ports that comprises first and second switching stages respectively composed of a plurality of first and second non-blocking switches. The first non-blocking switches have their inputs coupled to the input ports of the first stage. The second non-blocking switches have their inputs coupled to the outputs of the first non-blocking switches, and their outputs connected to the output ports. A contention arbitration circuit is provided between the inputs and the outputs of each of the second non-blocking switches. In response to requests for access to the output ports sent by each of the first nonblocking switches, the contention arbitration circuit selects the requests in accordance with priorities of the input ports initiating the requests, to prevent out-of-order delivery of the cells to the output ports.

In accordance with one aspect of the invention, the first non-blocking switches comprises means for dynamic modifying the priorities of the input ports in each cell switching cycle of the network. The dynamic modifying means is responsive to serial numbers of the input ports and offset values supplied to the first non-blocking stages in each cell switching cycle of the network.

Preferably, the arbitration circuit may comprise request lines between each of the inputs and each of the outputs of the second non-blocking switches, for sending signals that request acceptance of the cells to be transmitted from the inputs to the outputs. Cell acceptance lines are provided between each of the outputs and each of the inputs, for sending signals that acknowledge acceptance of the cells to be transmitted. Blocking request lines are arranged between each of the inputs and each of the outputs, for sending blocking request signals from the inputs to the outputs, when the outputs to be accessed have acknowledged acceptance of the cells in response to a previous request from the inputs sending the blocking request signals.

In accordance with another aspect of the invention, each of the second non-blocking switches supplies each of the first non-blocking switches with cell acceptance information to enable the first non-blocking switches to determine the input ports allowed to deliver the cells to the output ports in a current cell switching cycle.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 6 illustrates a format of a cell at the input of the ATM switch shown in FIG. 3.

FIG. 7 shows examples of blocking paths in the switch shown in FIG. 3.

FIG. 8 illustrates the encoded representation of requests for output port access.

FIG. 9 shows an example of effective serial numbers and cell route numbers for a switch of stage 1 in FIG. 3.

FIG. 10 shows examples of request sequences sent to switches of stage 2 in FIG. 3.

BEST MODE FOR CARRYING OUT THE INVENTION

Figures 1A, 1B:
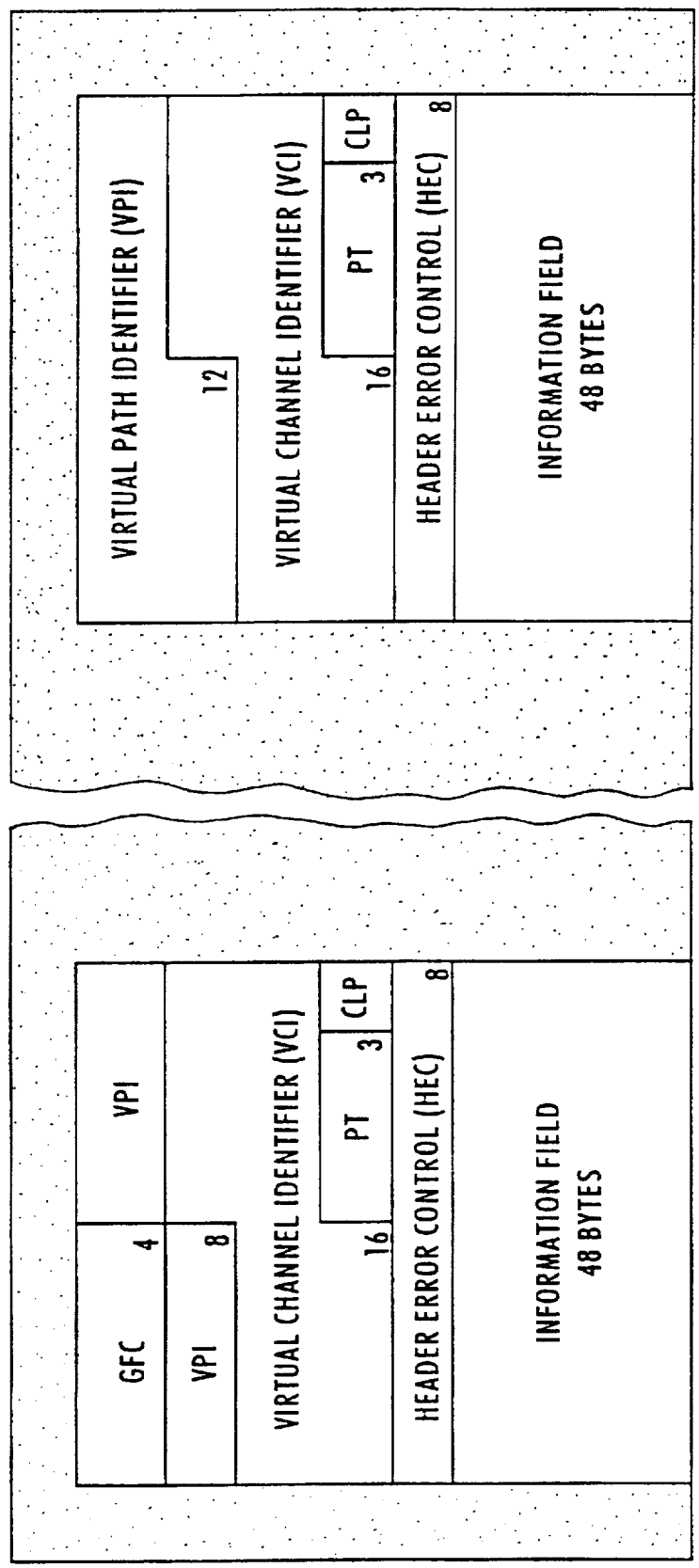
FIGS. 1A and 1B respectively illustrate formats of UNI cells and NNI cells.
Figure 2:
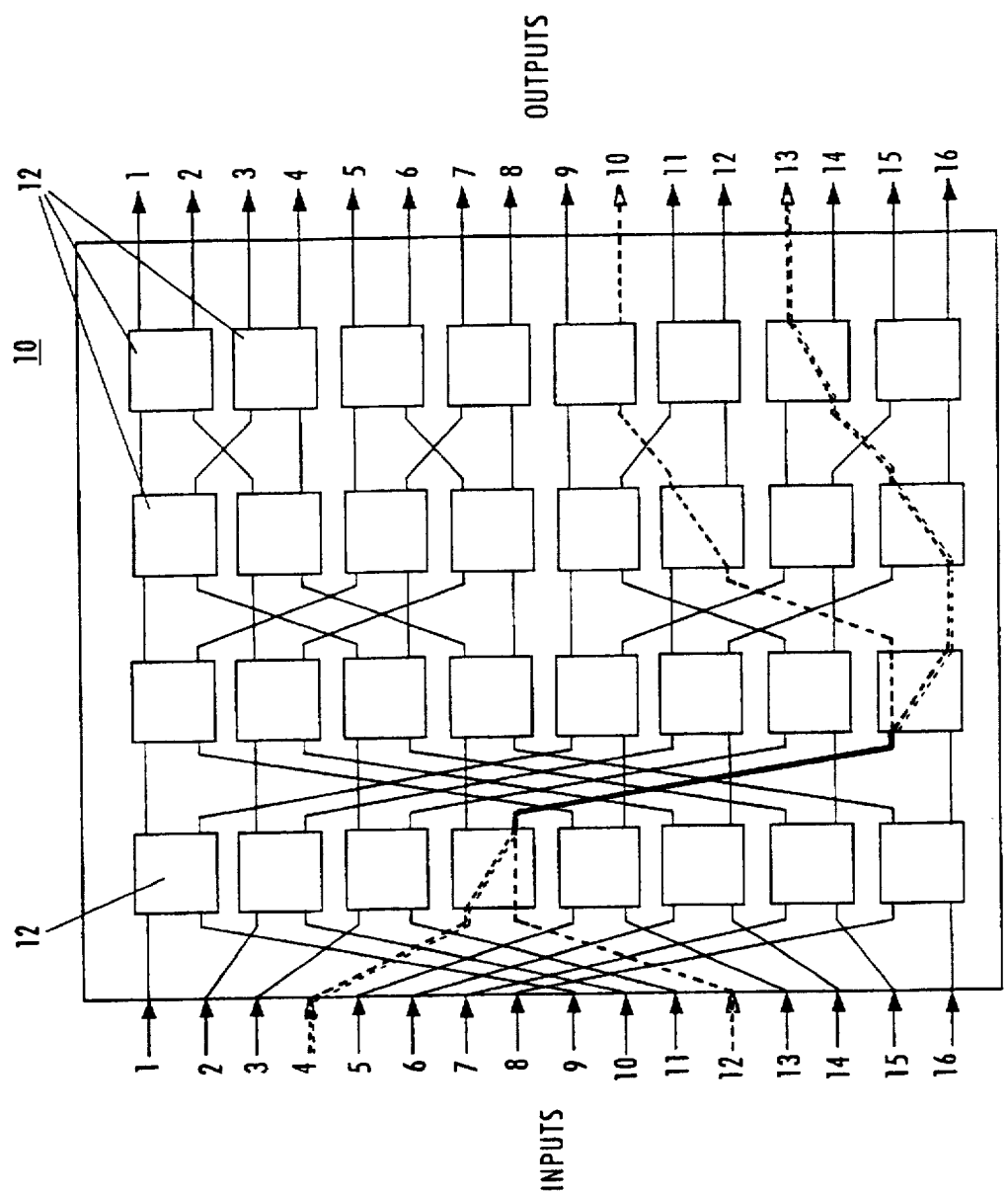
FIG. 2 is a block-diagram of a conventional Banyan network.
Figure 3:
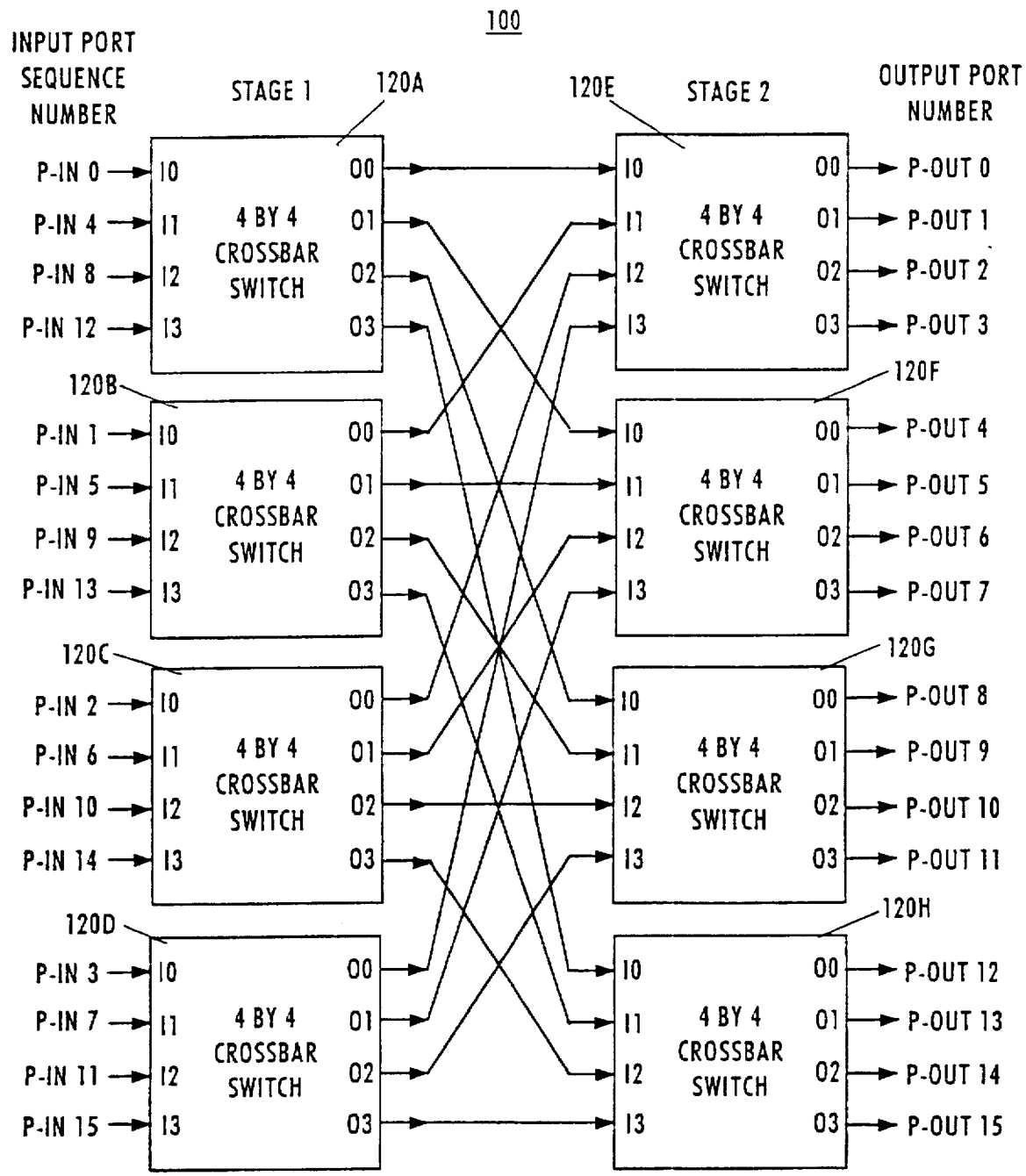
FIG. 3 is a block-diagram of an exemplary ATM switch of the present invention.

Although the invention has general applicability in the field of data communication networks, the best mode for practicing the invention is based in part on the realization of a contention resoluting system in an exemplary ATM switch network 100 shown in FIG. 3. This network comprises stage 1 composed of 4 by 4 crossbar switches 120A, 120B, 120C and 120D, and stage 2 coupled to the stage 1, and composed of 4 by 4 crossbar switches 120E, 120F, 120G and 120H. In the illustrated example, each of the crossbar switches 120A–120H comprises four inputs I0–I3, and four outputs O0–O3. However, the number of the inputs and outputs, and the number of the crossbar switches 120 in the network 100 may vary depending on the number of input and output ports to be connected to the network 100. Inputs I0, I1, I2 and I3 of the switch 120A are respectively connected to input ports P-IN 0, P-IN 4, P-IN 8 and P-IN 12. Inputs I0, I1, I2 and I3 of the switch 120B are respectively coupled to input ports P-IN 1, P-IN 5, P-IN 9 and P-IN 13. Inputs I0, Ii, I2 and I3 of the switch 120C are respectively coupled to input ports P-IN 2, P-IN 6, P-IN 10 and P-IN 14. Inputs I0, I1, I2 and I3 of the switch 120D are respectively connected to input ports P-IN 3, P-IN 7, P-IN 11 and P-IN 15. Outputs O0–I3 of each of the switches 120A–120D are coupled to corresponding inputs of the switches 120E120H. Outputs O0–I3 of the crossbar switches 120E, 120F, 120G, and 120D are respectively connected to output ports P-OUT 0–P-OUT 3, P-OUT 4–P-OUT 7, P-OUT 8–P-OUT 11, and P-OUT 12–P-OUT 15.

Figure 4:
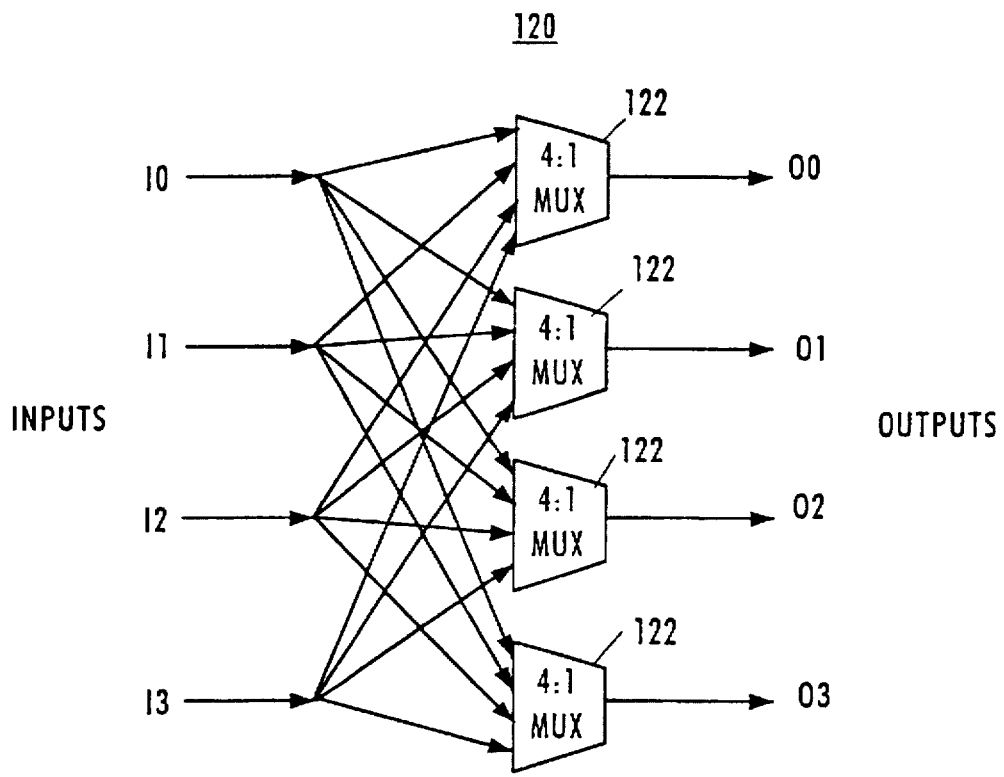
FIG. 4 is a schematic diagram of a 4 by 4 crossbar switch shown in FIG. 3.

Reference is now made to FIG. 4 of the drawings showing an exemplary structure of each of the crossbar switches 120A–120H. A dedicated non-blocking path allows each input I0–I3 in the switch 120 to be connected to each output O0–13 of the same crossbar switch, via a control unit 122. For example, each control unit 122 may contain a 4:1 multiplexer having four inputs connected to the inputs I0–I3, and an output coupled to one of the outputs O0–13. Thus, only one non-blocking path can be provided to each of the outputs O0–13 at any given time.

Multiple inputs may request connection to the same output port simultaneously. To resolve a conflict between the inputs, each input is assigned with its priority. Whenever there is a conflict between the inputs, the highest priority input is allowed to send data. The highest priority may correspond to the lowest serial number of the input port that supplies data. For example, input port P-IN 0 may have higher priority than input port P-IN 1, which in turn, has higher priority that input port P-IN 2, etc. In the network 100 shown in FIG. 3, serial numbers of the input ports are defined by the topology of the network.

Figure 5:
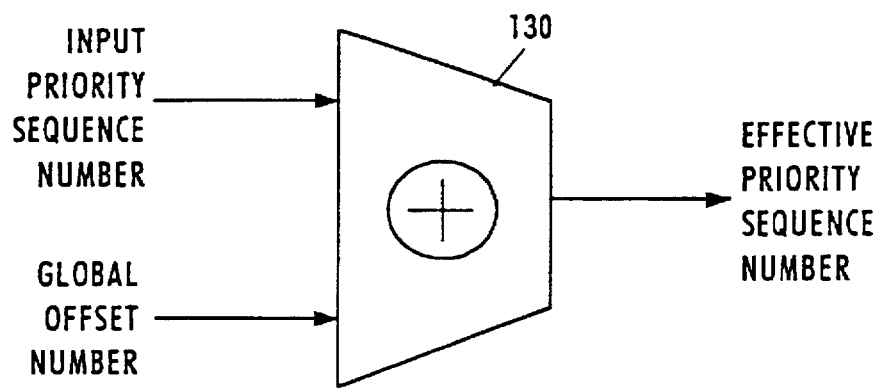
FIG. 5 is a diagram illustrating a circuit for the dynamic modification of input port priorities.

However, the priority of the input ports may be dynamically modified so as to assign different priorities to the same input port during different cell cycles. Each input port may be programmed with a unique physical serial number that allows the switch elements 122 of stage 1 to initially define the priority of the port. To provide the dynamic modification of input port priorities, the control unit 122 may be supplied with an offset number added to the physical serial number. As shown in FIG. 5, the dynamic priority modification procedure for each input port may be implemented using an adder 130 supplied with the physical serial number of an input port, and with a global offset number. An effective serial number calculated at the output of the adder 130 defines an effective input port priority. For each input port, a new global offset number may be sent by a network controller at the beginning of each cell switch cycle. For 16 input ports P-IN 0–P-IN 15 shown in FIG. 3, 4-bit adders 130 are provided to calculate effective serial numbers. For a 256-input switch architecture, 8-bit adders are required.

As discussed above, the input port serial numbers, that define the priorities of the input ports, are not consecutive within a single crossbar switch 120. For example, the input port P-IN 0 is connected to input I0 of the switch 120A. The input port P-IN 1 having the next serial number is connected to input I0 of the switch 120B, etc. Accordingly, the input ports with the first sequence of serial numbers (P-IN 0–P-IN 3) are coupled to inputs I0 of the switches 120A–120D. The input ports with the next sequence of serial numbers (P-IN 4–P-IN 7) are coupled to inputs I1. The input ports with the consequent serial numbers (P-IN 8–P-IN 11) are connected to inputs I2. And finally, the input ports having the last sequence of serial numbers (P-IN 12–P-IN 15) are coupled to the last inputs I3 of the switches 120A–120D. This numbering concept is applicable to any number of crossbar switches in the stage 1 with any number of inputs.

In the example shown in FIG. 3, the output ports P-OUT are numbered consecutively. Output ports P-OUT 0–P-OUT 3 are allocated to the crossbar switch 120E. Output ports P-OUT 4–P-OUT 7 are coupled to the outputs of the switch 120F. Output ports P-OUT 8–P-OUT 11 are allocated to the switch 120G, and finally, output ports P-OUT 12–P-OUT 15 are connected to the outputs of the switch 120H. However, it should be noted that any sequence of the output port serial numbers may be used. The crossbar switches 120A–120D in stage 1 are supplied with information that indicates the serial numbers of the output ports.

Reference is now made to FIG. 6 showing an exemplary format of a cell that arrive on an input of Stage 1. The Cell Route Number field indicates the output destination address where the cell is requested to be routed. The number of bits in this field depends on the total number of output ports supported by an ATM switch. For example, the switch 100 with 16 output ports requires the 4-bit Cell Route Number. To support a switch having 256 output ports, the Cell Route Number should contain 8 bits or more. The Internal Cell Header field contains cell ID information which enables further cell processing to be carried out after a cell is switched to the desired output port. As discussed above, in accordance with the ATM standards, the Cell Payload field that carries user information contains 48 bytes. Generally, each cell delivered to each input of Stage 1 is unique. Its cell route number and remaining data are independent from data of other cells.

Once per cell cycle, cells having formats presented in FIG. 6, are simultaneously sent to all inputs of Stage 1 crossbar switches. However, multiple cells destined for the same output port may arrived. In order to maintain cell sequence order, the dual stage switch 100 performs two tasks.

The first task is to select and accept the highest priority cell based on the effective serial number of the input port that receives the cell. The remaining cells that contend with the highest priority cell are rejected. Their input ports are notified of their rejection. The ATM system requeues the rejected cells during the next cell cycle. A separate network may be provided at the input of the dual stage network 100 to requeue the cells rejected in a previous cell cycle and supply them to the network 100 again.

The second task is to identify blocking paths between stage 1 and stage 2 of the switch network 100 and to signal to the input ports P-IN that a cell cannot be accepted due to internal blocking paths. Reference is now made to FIG. 7 showing an example of internal blocking paths in the dual stage network 100. In this example, input ports P-IN 0, P-IN 2, P-IN 4 and P-IN 5 receive cells destined for output ports P-OUT 9, P-OUT 9, P-OUT 8 and P-OUT 8, respectively. For example, the global offset number is set to 0, so the effective serial number is equal to the input port serial number. Accordingly, P-IN 0 has the highest priority, and input port P-IN 5 has the lowest priority among the discussed input ports.

Thus, input port P-IN 0, that has the highest priority, delivers its cell to output port P-OUT 9. At the same time, input port P-IN 2 attempts to deliver its cell to output port P-OUT 9. However, since output port P-OUT 9 has accepted a cell from a higher priority port P-IN 0, the cell from port P-IN 2 is rejected.

Input port P-IN 4 attempts to deliver its cell to output port P-OUT 8. Although port P-OUT 8 is not occupied, the route to this port includes output O2 of the crossbar switch 120A occupied by the cell from higher priority port P-IN 0. As a result, an internal blocking path is created at output O2 of the switch 120A.

Input port P-IN 5 attempts to deliver its cell to output port P-OUT 8. Although an unobstructed path exists between the ports P-IN 5 and P-OUT 8, the cell cannot be sent because it would result in out-of-order cell delivery. To prevent the out-of-order cell delivery, input port P-IN 4 informs output port P-OUT 8 that a cell cannot be delivered due to internal blocking and that no further cell should be accepted by output port P-OUT 8.

Essentially, the output ports retain three states: open, cell-accepting, and blocked. To prevent out-of-order cell delivery, all switches of stage 1 send requests for cell delivery to the appropriate switches of stage 2. After receiving these requests, the switches of stage 2 determine which cells should be accepted. If the request order is based on the effective serial numbers of sending ports, the switches of stage 2 start processing the requests without waiting until all of the requests are received.

If each switch of stage 1 has N inputs, then N encoded requests are sent from each switch of stage 1 to each switch of stage 2. If each switch of stage 2 has M outputs, then each encoded request should represent M+1 request values. For example, for switches 120E–120H having 4 outputs each, five request values are required. They can be defined by 3-bit code words. An example of information represented by each encoded request received by a switch of stage 2 is shown in FIG. 8. The first "0" bit of the request, indicates than no request for switching is made. The combination "100" in the encoded request indicates that connection to output O0 of the receiving switch is requested. The combinations "101", "110" and "111" respectively request connections to outputs O1, O2 and O3 of the switch. The discussed encoding scheme can be extended to any number of outputs in a switch of stage 2. An order of requests in a sequence of N encoded requests sent from each switch of stage 1 to each switch of stage 2 is defined by effective serial numbers of sending input ports. FIG. 9 shows an example of effective serial numbers and cell route numbers for inputs I0-I3 of a switch in stage 1. FIG. 10 illustrates a sequence of encoded requests sent to switches 120E-120H of stage 2 from the switch of stage 1 having the input parameters identified in FIG. 9. For example, switch 120E coupled to output ports P-OUT 0-P-OUT 3 receives a sequence of requests as follows: 000, 111, 100 and 000. The first request in this sequence is defined by input I0 having the highest priority, that does not have cells destined for the output ports associated with the switch 120E. The second request is defined by input I1 having the next priority, that attempts to send a cell to output port P-OUT 3. The third request represents input I2 having a cell destined for output port P-OUT 0. The last request is received from input I3 that attempts to deliver a cell to output port P-OUT 9 that is not associated with the switch 120E. All four requests sent from the switch 120A to the switch 120F are represented by 000, because none of the output ports identified by cell route numbers in FIG. 9 are associated with the switch 120F. Only the last request 101 in a request sequence sent to the switch 120G represents a cell destined to output port P-OUT 9 coupled to output O1 switch 120G. Other requests are represented by bits 000 that indicate that no output port of the switch 120G is requested. Finally, the first request (101) in a request sequence sent to switch 120H represents the highest priority input I0 that has a cell destined to output port P-OUT 13 coupled to output O1 of the switch 120H.

A sequence of encoded requests is received at the input of each switch of stage 2 and is loaded into a memory that stores a table of requests relating to the switch. Alternatively, the requests may be processing without storage. The size of the request table is determined by the number of the input to the switch and the number of the switch outputs. Each row in the request table represents the entire sequence of requests from each switch of stage 1. When the request table is formed, a switch of stage 2 has the information required to make an optimum selection based on the total number of requests received from each switch of stage 1. The request table for each switch of stage 2 has N rows representing N switches of stage 1, and M columns representing the length of encoded sequences. Column 0 corresponds to the first request in the sequence, and column M-1 represents the last request received by the switch from a given switch of stage 1. Row 0 corresponds to the first switch of stage 1, and row N-1 represents the request sequence from the last switch of stage 1. Using column-by-column scanning from row 0 to row N-1 the total sequence of encoded requests directed to a specific switch of stage 2 can be read.

Each column of the table is processed based on sequence priority. As discussed above, the first column corresponds to the highest priority requests, and the last column contains the lowest priority requests. Rows are processed based on top to bottom priority. Data in the top row of the table has the highest priority, whereas the bottom row corresponds to the lowest priority.

Figure 11:
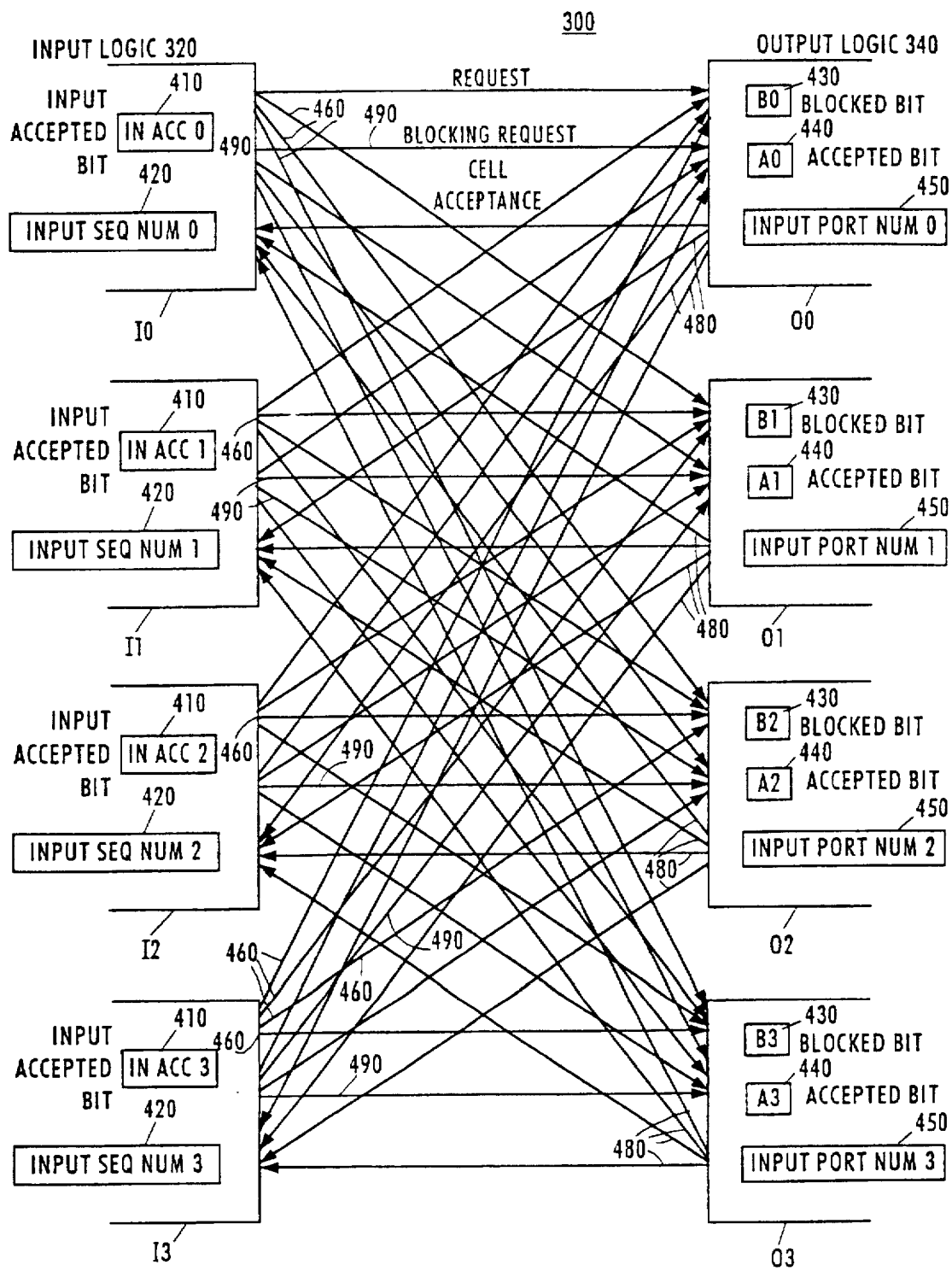
FIG. 11 is a schematic diagram of a contention arbitration logic.

Reference is now made to FIG. 11 showing a schematic diagram of contention arbitration logic 300 in each switch of stage 2. The contention arbitration logic 300 comprises input logic 320 associated with inputs I0-I3 of the switch in stage 2 and output logic 340 associated with outputs O0-O3 of the switch. For each of the inputs I0-I3, the input logic 320 comprises an input acceptance register 410 and an input sequence number register 420. The input acceptance register 410 contains a bit indicating whether or not a cell supplied via the corresponding input has been accepted by the output logic 340. The input sequence number register 420 stores an index indicating the serial number of a column in the request table of the switch. For each of the outputs O0-O3, the output logic 340 comprises a blocked bit register 430, an accepted bit register 440 and an input port number register 450. The blocked bit register 430 contains a bit indicating that the corresponding output is blocked for a requesting input. The accepted bit register 440 contains a bit indicating that the corresponding output will accept a cell from a requesting input. The input port number register 450 holds a bit combination indicating the number of the input port P-IN that requests connection with the corresponding output.

The contention arbitration logic 300 carries out a contention arbitration procedure as follows. At the beginning of a cell cycle of the ATM switch 100, the input ports P-IN supply the request table to each switch in stage 2 with their requests in sequential order. The contention arbitration logic 300 in each switch of stage 2 reads the request table associated with its switch. For example, logic sections of the input logic 320 associated with each input of the switch in stage 2 may read the request table separately. Before the first column of the request table is read, the input acceptance register 410, the output blocked bit register 430, and the output accepted bit register 440 are cleared. When the first column is read from the request table, the encoded value of each request is encoded. If the first bit of the request indicates that the requested output port is coupled to the switch that contains the logic 300 reading the request (for example, if the first bit is "1"), then other bits are treated as a valid request for access to an output port. In accordance with the value of the request, a request line 460 to the switch output coupled to the requested output port is asserted. One request line 460 may be asserted for each valid request.

When all of the request lines 460 are asserted, logic sections of the output logic 340 associated with each output of the switch determine priorities based on the priorities of the input ports. If multiple switch inputs assert request lines 460 to a single switch output, the output logic section associated with the switch output accepts the request from the switch input coupled to the input port with the highest priority. When a request is accepted, the accepted bit register 440 is set. The switch output acknowledges the acceptance by asserting a cell acceptance line 480 to the switch input coupled to the input port that made the acknowledged request. Only one cell acceptance line 480 may be asserted for each switch output. The number of the input port that made the acknowledged request is loaded into the input port number register 450. The combination of the bits in the accepted bit register 440 and input port number register 450 determines how the switch 100 is configured.

When a request is accepted, the input acceptance register 410 of the requesting input is set. The serial number of the column in the request table that relates to the requesting input port is recorded into the input sequence number register 420 for transmission back to the switch of stage 1 coupled to the requesting input port.

After the first column of the request table is processed, the remaining columns are read and processed sequentially one after another in the same manner as the first column. However, if a switch input decodes a valid request for access to an output port but its acceptance register 410 has been set, then a blocking request line 490 to a requested switch output is asserted, instead of the request line 460. The blocking request line 490 transmits a blocking signal that informs the switch output that the associated request cannot be granted because a previous request from the same switch input was previously acknowledged.

If a single switch output receives blocking requests from several switch inputs, the blocking request from the input port with the highest priority is accepted. When a blocking request is accepted, the blocked bit register 430 at the corresponding switch output is set. If the blocked bit register 430 or the accepted bit register 440 at a switch output are set, no further processing at the switch output is allowed. Further, when the blocked bit register 430 at a switch output is set, the accepted bit register 440 is prevented from being set.

If the request line 460 and the blocking request line 490 are asserted to the same switch output simultaneously, a request from a higher priority input port has a priority over a request from a lower priority input port. If the request line 460 and the blocking request line 490 are asserted by switch inputs coupled to input ports having the same priority, the blocking request has a priority over a request transmitted via the request line 460.

This procedure will continue until all columns of the request table are processed. The request table may be updated once per cell cycle.

At the end of the contention arbitration procedure for a given cell cycle, each input of the switches in stage 2 transmits back to each switch in stage 1, in a serial fashion, contents of their input acceptance registers 410 and input sequence number registers 420. For 4-input switches in stage 1, one bit is required to transmit contents of each register 410 and two bits for each register 420. In general terms, the number of bits required to be shifted back from each switch of stage 2 to each switch of stage 1 is equal to $1+\log_2 N$, where N is the number of encoded requests sent from the switch of stage 1 to the switch of stage 2.

Based on the information from stage 2, each switch of stage 1 determines which input port may deliver their cells to required output ports, and which cells will be rejected. The rejected cells may be queued for the next cell cycle. The accepted cells may be routed through switches of stage 1 and stage 2 without contention. The out-of-order delivery of cells will be prevented.

There accordingly has been described a contention resolution system which eliminates contention in a twostage crossbar ATM switch having internal blocking paths. To define priorities of input ports, switches of stage 1 calculate the effective serial numbers of the input ports based on their physical serial numbers and global offset values. To provide dynamic modification of the input port priorities, the global offset values can be changed in each cell cycle of the ATM switch. A sequence of encoded requests for access to required output ports are sent from each switch of stage 1 to each switch of stage 2. Contention arbitration logic in each switch of stage 2 determines which requests may be granted so as to avoid blocking paths between stages 1 and 2, and to prevent out-of-order cell delivery. Signals that acknowledge acceptance of cells and provide information required to establish the serial numbers of the accepted input ports are sent back from each switch of stage 2 to each switch of stage 1. Based on these signals, the cells that will be accepted are routed through the switches of stages 1 and 2 to required output ports. The rejected cells may be queued for transmitting in the next cell cycle.

Accordingly, the present invention allows the out-of-order delivery of cells to be prevented without the resequencing of the cells at output ports.

In this disclosure, there are shown and described only the preferred embodiments of the invention, but it is to be understood that the invention is capable of changes and modifications within the scope of the inventive concept as expressed herein.

I claim:

1. A cell switching network for delivering cells from input ports to output ports in accordance with destination addresses of the cells, comprising:

a first switching stage including a plurality of first non-blocking switches having inputs coupled to said input ports, a second switching stage including a plurality of second non-blocking switches having inputs coupled to outputs of the first non-blocking switches, and outputs coupled to said output ports, and a contention arbitration circuit provided between the inputs and the outputs of each of the second non-blocking switches, and responsive to requests for access to the output ports sent by each of the first non-blocking switches, for selecting the requests in accordance with priorities of the input ports initiating the requests.

said contention arbitration circuit including:

an input logic circuit arranged for each input of said second switching stage, an output logic circuit arranged for each output of said second switching stage, a request line for supplying from said input logic circuit to said output logic circuit a request for access from an input of said second switching stage to an output of said second switching stage.

a cell acceptance line for supplying from said output logic circuit to said input logic circuit an acceptance signal indicating that said request is granted, an input acceptance bit being transmitted to said first switching stage when said acceptance signal is received to enable said first switching circuit to determine which of the cells are acceptable for the corresponding input of said second switching circuit, and a blocking request line for supplying from said input logic circuit to said output logic circuit a signal for blocking said request signal when a previous request from said input was acknowledged, to prevent out-of-order delivery of the cells due to blocking paths between said first and second switching stages.

2. The network of claim 1, wherein said first non-blocking switches comprises means for dynamic modifying the priorities of the input ports in each cell switching cycle of the network.

3. The network of claim 2, wherein said dynamic modifying means is responsive to serial numbers of the input ports and offset values supplied to the first non-blocking stages in each cell switching cycle of the network.

4. The network of claim 1, wherein each of said first and second non-blocking switches comprises a crossbar switch.

5. The network of claim 1, wherein said contention arbitration circuit comprises multiple request lines arranged between each of the inputs and each of the outputs of each of the second non-blocking switches, for sending request signals requesting acceptance of the cells to be transmitted from the inputs to the outputs of the second non-blocking switches.

6. The network of claim 5, wherein said contention arbitration circuit further comprises multiple cell acceptance lines arranged between each of the outputs and each of the inputs of each of the second non-blocking switches, for sending acknowledgement signals from the outputs to the inputs of the second non-blocking switches, to acknowledge acceptance of the cells to be transmitted.

7. The network of claim 6, wherein said contention arbitration circuit further comprises multiple blocking request lines between each of the inputs and each of the outputs of each of the second non-blocking switches, for sending blocking request signals from the inputs to the outputs of the second non-blocking switches, when the outputs to be accessed have acknowledged acceptance of the cells in response to a previous request from the inputs sending the blocking request signals.

8. The network of claim 1, wherein each of said second non-blocking switches supplies each of said first non-blocking switches with cell acceptance information to enable said first non-blocking switches to determine the input ports allowed to deliver the cells to the output ports in a current cell switching cycle.

9. A method of contention resolution in an ATM switching network including a first stage of non-blocking switches having inputs coupled to input ports of the ATM switching network, and a second stage of non-blocking switches coupled to the first stage and having outputs coupled to output ports of the ATM switching network, comprising the steps of:

forming a request table containing encoding requests from each switch of the first stage for access to the output ports through the switches of the second stage coupled to the required output ports, reading the request table by each switch of the second stage to supply request signals to the required output ports, selecting acceptable signals among the request signals, based on priorities of the input ports initiating the requests, blocking further request signals supplied to the output ports that have selected the acceptable signals, to prevent out-of-order delivery of cells to the output ports, and supplying the first stage with information regarding the acceptable signals to enable the first stage to determine the input ports allowed to send cells to the output ports.

10. The method of claim 9, wherein the priorities of the input ports are dynamically modified in each cell switching cycle of the ATM switching network.

11. The method of claim 10, wherein various offset signals are supplied to the first stage to modify the priorities of the input ports.

12. The method of claim 11, wherein the offset signals are added to serial numbers of the input ports to set effective priorities of the input ports.

13. The method of claim 9, wherein an order of the requests in a sequence read by each switch of the second stage is defined by the priorities of the input ports initiating the requests.

14. In an ATM network for switching cells between input ports and output ports using at least two switching stages arranged between said input ports and said output ports, a contention resolution system comprising:

an input logic circuit for receiving encoded requests from the input ports for access to the output ports, and an output logic circuit responsive to request signals from the input logic circuit for selecting acceptable requests based on priorities of the input ports, said input logic circuit supplying said output logic circuit with blocking signals to block the requests resulting in creating internal blocking oaths between said switching stages, to prevent out-of-order delivery of the cells to the output ports.

15. The network of claim 1, wherein said input logic circuit comprises an input acceptance register for setting said input acceptance bit when said request is granted.

16. The network of claim 1, wherein said output logic circuit comprises an accepted bit register for storing a bit indicating that the output of the second switching stage will accept a cell from a requesting input of the second switching stage.

17. The network of claim 1, wherein said output logic circuit comprises a blocked bit register for storing a bit indicating that the output of the second switching stage is blocked for a requesting input of the second switching stage.

* * * * *

UNITED STATES PATENT AND TRADEMARK OFFICE
CERTIFICATE OF CORRECTION

PATENT NO.   : 5,784,374
DATED        : July 21, 1998
INVENTOR(S)  : Thomas Jefferson RUNALDUE It is certified that error appears in the above-indentified patent and that said Letters Patent is hereby corrected as shown below:

In the claims, Claim 14, line 12, please change "oaths" to --paths--

Signed and Sealed this

Twenty-sixth Day of January, 1999

Attest:

Attesting Officer

*Acting Commissioner of Patents and Trademarks*